US012629850B2

(12) United States Patent
Huang et al.

(10) Patent No.: US 12,629,850 B2
(45) Date of Patent: May 19, 2026

(54) APPARATUS AND METHOD FOR AUTOMATED MAINTENANCE

(71) Applicant: WE SOLUTIONS TECHNOLOGY CO., LTD, Taoyuan City (TW)

(72) Inventors: Chung-Peng Huang, Taoyuan City (TW); Fang-Yi Lin, Taoyuan City (TW); Kuan-Lin Chen, Taoyuan City (TW); Chun-Ching Kuo, Taoyuan City (TW)

(73) Assignee: WE SOLUTIONS TECHNOLOGY CO., LTD, Taoyuan City (TW)

( * ) Notice: Subject to any disclaimer, the term of this patent is extended or adjusted under 35 U.S.C. 154(b) by 406 days.

(21) Appl. No.: 18/542,799

(22) Filed: Dec. 18, 2023

(65) Prior Publication Data

US 2025/0001622 A1      Jan. 2, 2025

Related U.S. Application Data

(60) Provisional application No. 63/511,185, filed on Jun. 30, 2023.

(51) Int. Cl.
| | |
|---|---|
| *B25J 21/00* | (2006.01) |
| *B25J 11/00* | (2006.01) |
| *F25B 21/02* | (2006.01) |
| *F25D 21/14* | (2006.01) |
| *H01H 1/64* | (2006.01) |
| *H01H 15/10* | (2006.01) |

(52) U.S. Cl.
CPC ............. *B25J 21/00* (2013.01); *B25J 11/005* (2013.01); *F25B 21/02* (2013.01); *F25D 21/14*

(2013.01); *H01H 1/64* (2013.01); *H01H 15/10* (2013.01); *H01H 2223/002* (2013.01)

(58) Field of Classification Search
CPC ...... B25J 21/00; B25J 11/005; B25J 19/0029; B25J 18/00; B25J 9/1674; B25J 9/042; F25B 21/02; F25D 21/14; H01H 1/64; H01H 15/10; H01H 2223/002; H01H 9/04
See application file for complete search history.

(56) References Cited

U.S. PATENT DOCUMENTS

| | | | |
|---|---|---|---|
| 2013/0097802 A1* | 4/2013 | Rioufrays | B08B 5/04 |
| | | | 15/309.2 |
| 2019/0218029 A1* | 7/2019 | Petz | F25D 17/06 |

(Continued)

*Primary Examiner* — Eric J Yoon

(57) ABSTRACT

An apparatus for automated maintenance, adapted for maintaining an airtight equipment comprises airtight equipment including a casing, which forms an accommodation space and is adapted to accommodate an equipment component in the accommodation space. The apparatus for automated maintenance includes an automated maintenance machine, adapted to store and transport the equipment component, an enclosure, connected to the automated maintenance machine, the enclosure forming an enclosure space and selectively connected to the airtight equipment via an enclosure opening such that the enclosure space is in communication with the accommodation space and forms airtightness. A robotic arm, disposed in the enclosure space, is adapted to enter the accommodation space to maintain or replace the equipment component of the airtight equipment, and further adapted to enter the automated maintenance machine to take and place the equipment component.

13 Claims, 10 Drawing Sheets

(56)　　　　　　　References Cited

U.S. PATENT DOCUMENTS

2022/0134561 A1 *　5/2022　Graham ................. B25J 9/1676
　　　　　　　　　　　　　　　　　　700/245
2022/0216035 A1　　7/2022　Ueda et al.
2022/0344183 A1 *　10/2022　Trussell ............. H10P 72/0464

* cited by examiner

<u>10</u>

10

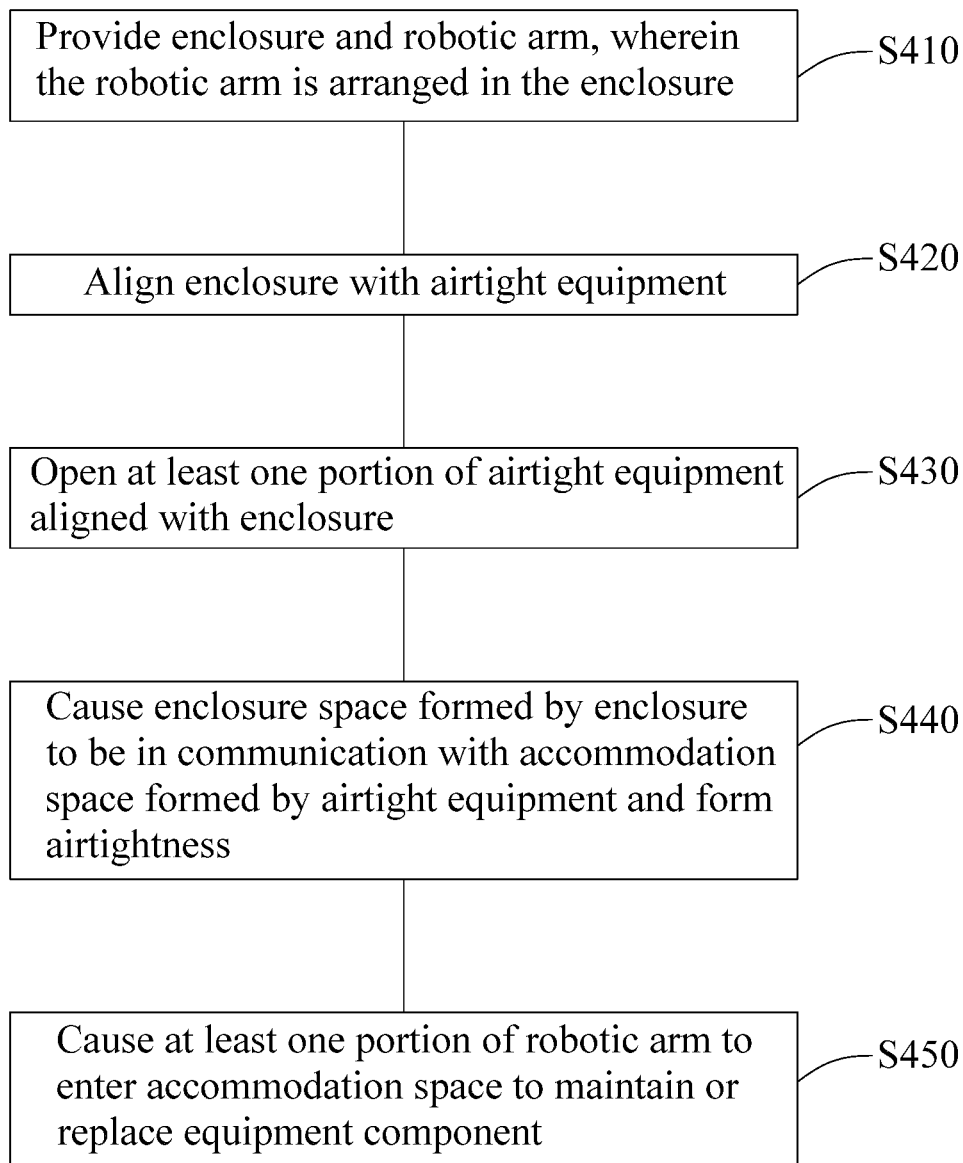

Provide enclosure and robotic arm, wherein the robotic arm is arranged in the enclosure — S410

Align enclosure with airtight equipment — S420

Open at least one portion of airtight equipment aligned with enclosure — S430

Cause enclosure space formed by enclosure to be in communication with accommodation space formed by airtight equipment and form airtightness — S440

Cause at least one portion of robotic arm to enter accommodation space to maintain or replace equipment component — S450

FIG. 4

APPARATUS AND METHOD FOR AUTOMATED MAINTENANCE

CROSS-REFERENCE TO RELATED APPLICATION

This non-provisional application claims priority under 35 U.S.C. § 119 (e) on U.S. provisional Patent Application No. 63/511,185 filed on Jun. 30, 2023, the entire contents of which are hereby incorporated by reference.

BACKGROUND OF THE INVENTION

1. Field of the Invention

The present disclosure provides an apparatus and a method for automated maintenance, and in particular to an apparatus and a method for automated maintenance that perform maintenance under a sealed space and airtight conditions.

2. Description of the Related Art

In industrial processes or high-performance computing devices, gases with environmental pollution or health hazards frequently need to be used. To prevent related gas leakage or waste, it is necessary for cabinets of related apparatuses or devices be designed with good airtightness.

For example, accompanied with rapid increases in power and heat flux densities of heating components of electronic elements related to computing in computers, immersion cooling is one of the most effective techniques to quickly reduce the amount of heat generated by electronic computing components. In two-phase immersion cooling, phase change heat transfer is performed in an enclosed space of a machine, a coolant boils (such as perfluoro-ketone approaching a boiling point of 50° C.) and becomes a coolant gas. The coolant gas is condensed through a condenser tube above, and after condensation a liquid returns to a lower part. Thus, without needing to provide additional resources or pump power for heat dissipation, an effect of coolant circulation is achieved.

However, during maintenance or element replacement of the two-phase immersion cooling apparatus above, a switch of the cooling apparatus needs to be turned on. At this point, the coolant gas originally in the device can easily diffuse into factory areas, machine rooms, or the atmosphere, further resulting in environmental pollution or occupational safety hazards to personnel.

BRIEF SUMMARY OF THE INVENTION

Therefore, in response to requirements for repair, maintenance, replacement of internal elements, and replacement of spare parts, these cooling apparatuses or airtight equipment requiring good airtightness need comprehensive airtightness protection measures, so as to prevent gases in these airtight equipment from leaking or diffusing during a period of such maintenance or replacement and hence from failing the intended purpose of airtightness.

Moreover, during maintenance or element replacement of airtight equipment such as cooling apparatuses, the maintenance or element replacement is usually carried out by a manual or manual semi-automated approach. However, manual operations may encounter numerous issues such as manual operation errors, labor costs, and poorer efficiency of manual operations in large factory areas. In addition, in conventional manual operations, related personnel may easily come into contact with gases in airtight equipment during the maintenance, such that on top of large amounts of labor costs, hazards, or risks of exposure of personnel to chemicals can easily result.

Therefore, it is important to provide an apparatus and a method for automated maintenance in the aim of keeping an airtight equipment under repair and maintenance completely airtight during the process of maintenance and element replacement operations, so as to prevent gas leakage or diffusion and to achieve fully automated maintenance and element replacement.

In view of the above, the present disclosure provides an apparatus and a method for automated maintenance. With an arrangement of an enclosure and a robotic arm, an equipment component in a target airtight equipment can be replaced in an airtight environment, and a function of automatedly maintaining the target airtight equipment can be achieved under airtight conditions.

An apparatus for automated maintenance adapted for maintaining an airtight equipment is provided according to an embodiment of the present disclosure. The airtight equipment includes a casing, which forms an accommodation space and is adapted to accommodate an equipment component in the accommodation space. The device for automated maintenance includes: an automated maintenance machine, adapted to store and transport the equipment component; an enclosure, connected to the automated maintenance machine, the enclosure forming an enclosure space and selectively connected to the airtight equipment via an enclosure opening such that the enclosure space is in communication with the accommodation space and forms airtightness; and a robotic arm, disposed in the enclosure space, adapted to enter the accommodation space to maintain or replace the equipment component of the airtight equipment, and further adapted to enter the automated maintenance machine to take and place the equipment component.

In an embodiment of the apparatus for automated maintenance further includes a motion module. The motion module is arranged at the automated maintenance machine, and is adapted to receive a motion signal to thereby drive the automated maintenance machine to move.

In an embodiment of the apparatus for automated maintenance, the enclosure is arranged on an outer side of the automated maintenance machine, and the enclosure extends in a direction away from the automated maintenance machine.

In an embodiment of the apparatus for automated maintenance, the enclosure further includes a maintenance door, and the maintenance door and the enclosure opening are arranged on two different sides.

In an embodiment of the apparatus for automated maintenance, the automated maintenance machine further includes a wireless communication module, which is adapted to communicate with the airtight equipment or an outside environment.

In an embodiment of the apparatus for automated maintenance, the wireless communication module communicates with the airtight equipment to determine maintenance requirement information associated with an equipment component of the airtight equipment, automatedly pairs the automated maintenance machine with the airtight equipment according to the maintenance requirement information, and sends the motion signal to prompt the automated maintenance machine to move to the airtight equipment.

In an embodiment of the apparatus for automated maintenance, the automated maintenance machine is adapted to perform the operations of receiving maintenance require-
ment information, controlling the motion module to move to
the airtight equipment, controlling the enclosure to be con-
nected to the airtight equipment and form airtightness, and
controlling the robotic arm to enter the accommodation
space so as to maintain or replace the equipment component.

In an embodiment of the apparatus for automated main-
tenance, the automated maintenance machine is further
adapted to perform the operations of determining a concen-
tration of a residual gas in the enclosure space, and control-
ling the enclosure to disengage from the airtight equipment.

In an embodiment of the apparatus for automated main-
tenance, the enclosure further includes a gas condensation
recollection module, which is adapted to recollect a residual
gas.

In an embodiment of the apparatus for automated main-
tenance, the enclosure further includes an airtight switch
which is adapted to selectively be arranged in alignment
with the airtight equipment, such that the enclosure is
connected in an airtight manner to the airtight equipment.

A method for automated maintenance adapted for an
airtight equipment is provided according to an embodiment
of the present disclosure. The method for automated main-
tenance includes: providing an enclosure and a robotic arm,
wherein the robotic arm is arranged in the enclosure; align-
ing the enclosure with the airtight equipment; opening at
least one portion of the airtight equipment aligned with the
enclosure; causing an enclosure space formed by the enclo-
sure to be in communication with an accommodation space
formed by the airtight equipment and forming airtightness;
and causing at least one portion of the robotic arm to enter
the accommodation space so as to maintain or replace an
equipment component.

In an embodiment of the present disclosure the method for
automated maintenance further includes receiving mainte-
nance requirement information of the airtight equipment,
and moving the enclosure and the robotic arm to the airtight
equipment.

In an embodiment of the present disclosure the method for
automated maintenance further includes determining a con-
centration of a residual gas in the enclosure space, and
controlling the enclosure to disengage from the airtight
equipment.

In an embodiment of the present disclosure the method for
automated maintenance further includes recollecting the
residual gas in the enclosure space.

With the apparatus and the method for automated main-
tenance of the present disclosure, during maintenance or
element replacement of an airtight equipment, the airtight-
ness of joining between the enclosure and the airtight
equipment is capable of preventing an internal gas from
leaking or diffusing into the ambient environment when the
airtight equipment is opened. Moreover, with the automated
maintenance machine and the robotic arm provided, labor or
human intervention can be completely eliminated. Thus,
related personnel are prevented from risks of coming into
contact with or exposure to the internal gas during mainte-
nance of the airtight equipment. In addition, the fully
automated mode can significantly reduce related labor and
maintenance costs, and achieve fully automated element
replacement and machine maintenance. Moreover, with the
combination of the automated maintenance machine, the
robotic arm and the enclosure of the apparatus for automated
maintenance of the present disclosure, the apparatus for
automated maintenance is able to effectively move around in
large-area factories, and reliably ensures the elimination of
risks of gas diffusion during an operation process.

BRIEF DESCRIPTION OF THE DRAWINGS

FIG. 4 is a schematic diagram of operations of a method
for automated maintenance according to an embodiment of
the present disclosure.

DETAILED DESCRIPTION OF THE INVENTION

The technical contents of the present disclosure are to be
further described in detail by way of embodiments with the
accompanying drawings. It should be noted that, in the
present disclosure of the literature, terms such as "first",
"second" and "third" are used to distinguish differences
among elements, and are not to be construed as limiting to
the elements themselves and specific orders of the elements.
Moreover, in the present disclosure of the literature, a
specific number is specified, the article "a/an/one" refers to
one element or more.

To fully understand the objects, features, and effects of the
present disclosure, the present disclosure is described in
detail by way of specific embodiments with the accompa-
nying drawings.

Figure 1:
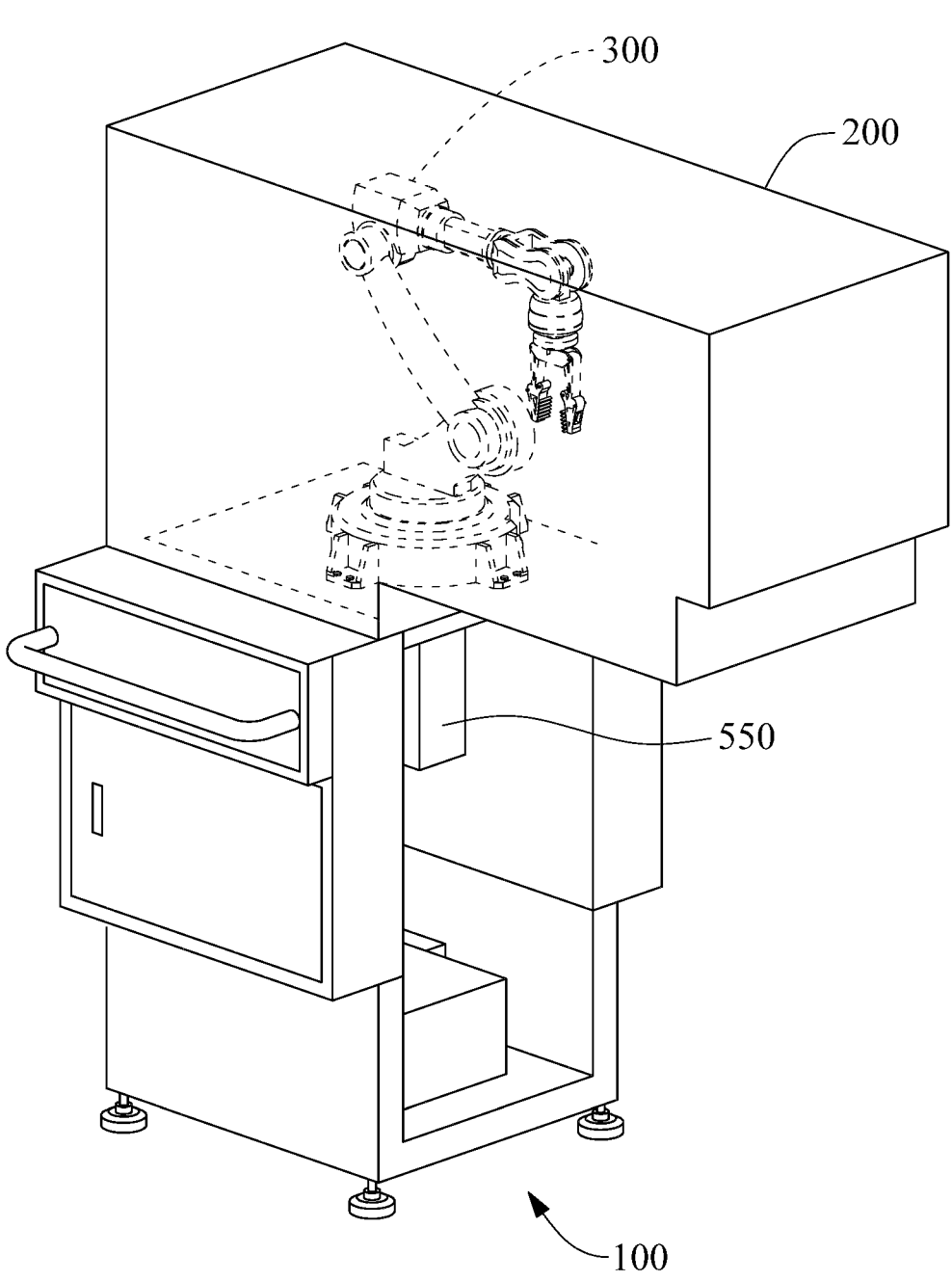
FIG. 1 is a perspective diagram of an apparatus for
automated maintenance according to an embodiment of the
present disclosure.

FIG. 1 shows a schematic diagram of an apparatus for
automated maintenance according to an embodiment of the
present disclosure. Also refer to FIG.

3A showing a schematic diagram of an operation of an
apparatus for automated maintenance according to an
embodiment of the present disclosure. The apparatus 10 for
automated maintenance includes an automated maintenance
machine 100, an enclosure 200 and a robotic arm 300. The
apparatus 10 for automated maintenance is adapted to main-
tain an airtight equipment 500. The airtight equipment 500
includes a casing 510, which forms an accommodation
space and is adapted to accommodate an equipment com-
ponent 550 in the accommodation space. In an embodiment
of the present disclosure, the airtight equipment 500
includes, for example but not limited to, various types of
machines or devices that need to be kept airtight and prevent
gas leakage during operations, such as cooling devices, computing devices, and process cleansing devices. In an embodiment of the present disclosure, the equipment component 500 includes, for example but not limited to, electronic equipment components, electronic computing devices and operation heat generating elements such as servers, processors, and graphics processors. The automated maintenance machine 100 is adapted to store and transport the equipment component 550. The enclosure 200 is connected to the automated maintenance machine 100, forms an enclosure space, and is selectively connected to the airtight equipment 500 via an enclosure opening, such that the enclosure space is in communication with the accommodation space and forms airtightness. The robotic arm 300 is disposed in the enclosure space, and is adapted to enter the accommodation space of the airtight equipment 500 so as to maintain or replace equipment components 550 of the airtight equipment 500, such that all operations of the robotic arm 300 are performed in an airtight environment within the enclosure 200. The robotic arm 300 is further adapted to enter the automated maintenance machine 100 to take or place the equipment component, for example, placing a damaged equipment component 550 taken out from the airtight equipment 500 in the automated maintenance machine 100, or taking a new equipment component 550 that is to be used for replacement in the airtight equipment 500. In an embodiment of the present disclosure, the automated maintenance machine 100 can be used for storing, carrying, or transporting the equipment component 550 and other maintenance related elements or supplement spare parts, for example, coolant refills or liquid consumables needed by a cooling apparatus or an airtight equipment. In an embodiment of the present disclosure, the equipment component 550 can further include an electronic device spare part and an electronic device eliminated part.

In an embodiment of the present disclosure, the apparatus 10 for automated maintenance further includes a motion module. The motion module is arranged at the automated maintenance machine 100, and is adapted to receive a motion signal to thereby drive the automated maintenance machine 100 to move. In an embodiment of the present disclosure, the automated maintenance machine 100 is an automated guided vehicle (AGV). In an embodiment of the present disclosure, the motion signal received by the motion module can come from a user operation interface located at the automated maintenance machine 100, a wired communication, a wireless communication, or a cloud server. In an embodiment of the present disclosure, the arrangement of the motion module enables the automated maintenance machine 100 to move around in factories, plants, and operation areas, and to move to the position of a target machine for which maintenance is to be performed, without involving labor or mechanical transportation means.

In an embodiment of the present disclosure, the enclosure 200 is arranged on an outer side of the automated maintenance machine 100, and extends in a direction away from the automated maintenance machine 100, such that the enclosure space formed by the enclosure 200 is also able to extend so as to increase a range of the airtight space and to adapt to different forms of various airtight equipment 500. The extended enclosure space can coordinate with different positions of openings or different positions of airtight switches of different airtight equipment 500, and a target machine device can be appropriately covered by the enclosure 200. In an embodiment of the present disclosure, the enclosure 200, when not in use, can be accommodated in the automated maintenance machine 100, and can transform from an accommodated form into an extended form by using a mechanism such as a sliding track or collapsing. In an embodiment of the present disclosure, the enclosure 200 is normally disposed on the outer side of the automated maintenance machine 100.

Figure 2:
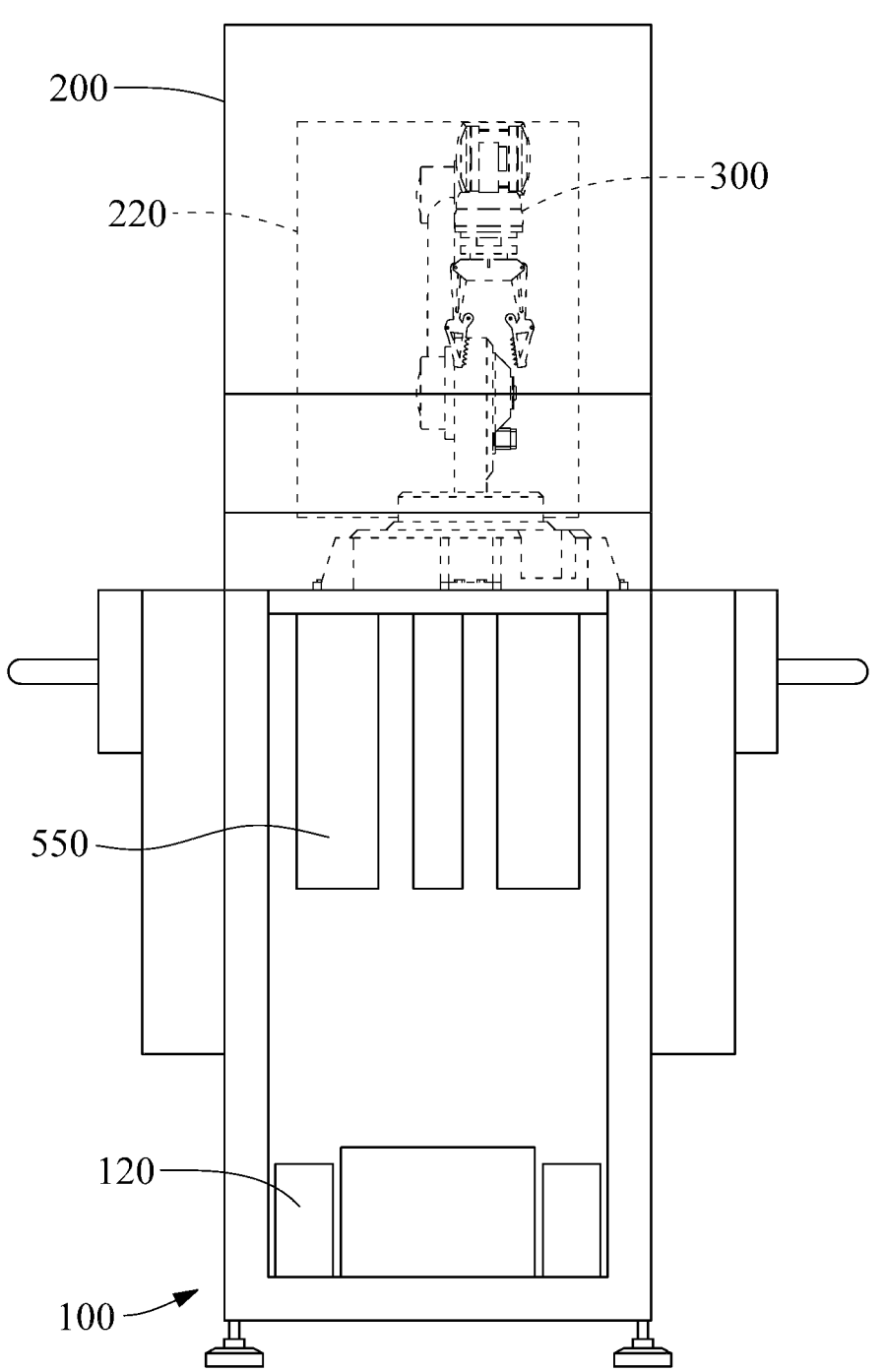
FIG. 2 is a side view of an apparatus for automated
maintenance according to an embodiment of the present
disclosure.

FIG. 2 shows a side view of an apparatus for automated maintenance according to an embodiment of the present disclosure. In an embodiment of the present disclosure, the automated maintenance machine 100 further includes a liquid reservoir 120 so as to be adapted to store liquid spare parts used by the airtight equipment 500, such as coolants and lubricants. In an embodiment of the present disclosure, the enclosure 200 further includes a maintenance door 220. The maintenance door 220 can further include a maintenance window and a maintenance baffle, wherein joining of the maintenance baffle and the maintenance window can maintain the airtightness of the maintenance door 220. Moreover, the maintenance door 220 and the opening of the enclosure 200 are arranged on two different sides, thereby maintaining the flexibility for other necessary mechanical or manual intervention without removing the entire enclosure 200 when the airtight enclosure 200 encounters problems, while leaving the original airtight function at the opening of the enclosure 200 unaffected. The maintenance door 220 can be disposed on any surface different from the opening of the enclosure 220. For example, as shown in FIG. 2, the maintenance door 220 can be disposed on a surface away from the automated maintenance machine 100, or can be disposed on any surface on left, right, upper, and rear sides, so as to meet different inspection and repair needs. It should be noted that, the maintenance door 220 is normally in a closed airtight state so as to maintain airtightness in the enclosure space. The airtightness of the maintenance door 220 can be sustained by means of such as an airtight switch, a ring rubber strip, screw locking, and fitted fixing. In an embodiment of the present disclosure, the liquid reservoir 120 is adapted for a machine to carry out material replenishment and/or waste discharge, such as replenishing coolant, replenishing water, extracting and replacing coolant, and extracting waste water.

In an embodiment of the present disclosure, the automated maintenance machine 100 further includes a wireless communication module. The wireless communication module is adapted to communicate with the airtight equipment 500, or an outside which is, for example, other electronic devices, servers, workstations, industrial computers, Internet-of-things (IoT), portable electronic apparatuses, or other machines and devices, so that the automated maintenance machine 100 can communication with the outside environment to perform data transmission or remote control.

In an embodiment of the present disclosure, the wireless communication module communicates with the airtight equipment 500 to determine maintenance requirement information associated with an equipment component of the airtight equipment 500, controls the automated maintenance machine 100 to automatedly pair with the airtight equipment 500 according to the maintenance requirement information, and sends the motion signal to prompt the automated maintenance machine 100 to move to the position of the airtight equipment 500, so as to get ready for subsequent repair, maintenance, or replacement operations. In an embodiment of the present disclosure, the maintenance requirement information is, for example, a signal to be maintained from a machine to be maintained. In an embodiment of the present disclosure, the maintenance requirement information can include machine information, electronic apparatus damage information, and component replacement information, and a machine pairing mechanism is further provided for pairing the apparatus 10 for automated maintenance with the airtight equipment 500 to be maintained and automatedly moving to the position of the airtight equipment 500 to be maintained. In an embodiment of the present disclosure, the automated maintenance machine 100 determines, according to a predetermined determination standard or a determination standard input from a user interface and the maintenance requirement information, whether the airtight equipment 500 needs maintenance, or items of the airtight equipment 500 that need maintenance or component replacement.

In an embodiment of the present disclosure, the automated maintenance machine 100 above is adapted to perform a process of the following operations so as to perform a maintenance operation of the airtight equipment 500. The process includes receiving maintenance requirement information, controlling the motion module to move to the airtight equipment 500, controlling the enclosure 200 to connect to the airtight equipment 500 and form airtightness, and controlling the robotic arm 300 to enter the accommodation space of the airtight equipment 500 so as to maintain or replace the equipment component 550. In an embodiment of the present disclosure, the operation of receiving the maintenance can be implemented by reception by a user interface, a wireless communication module, or a wired communication module of the automated maintenance machine 100. In an embodiment of the present disclosure, the operation of controlling the motion module to the airtight equipment 500 can be implemented by reception and control by a user interface, a wireless communication module, or a wired communication module of the automated maintenance machine 100.

In an embodiment of the present disclosure, the automated maintenance machine 100 is further adapted to perform the operations of determining a concentration of a residual gas in the enclosure space, and controlling the enclosure 200 to disengage from the airtight equipment 500. After the maintenance operation on the airtight equipment 500 is complete and a cover structure 520 of the airtight equipment 500 is closed, although the enclosure space and the accommodation space are no longer in communication at this point, it is possible for the enclosure space to contain a residual gas diffused out from the airtight equipment 500. In an embodiment of the present disclosure, after the maintenance operation is complete, the enclosure 200 does not directly disengage from the airtight equipment 500 and hence still maintains the airtightness of the enclosure space, and the concentration of the residual gas in the enclosure space is determined at this point. Only when it is ensured that the concentration of the residual gas is less than a predetermined standard, the enclosure 200 is then controlled to disengage from the airtight equipment 500. Thus, the gas in the airtight equipment 500 is prevented from leaking or diffusing when the enclosure 200 is disengaged. In an embodiment of the present disclosure, the operation of determining the concentration of the residual gas in the hood space is implemented by a gas detector, which is adapted to detect a concentration of a gas and also adapted to detect the type of a gas.

In an embodiment of the present disclosure, the apparatus 10 for automated maintenance further includes a gas condensation recollection module, which is adapted to recollect the residual gas remaining in the enclosure space of the enclosure 200. The condensation recollection module is configured to import a gas into a condensation module by means of cooling and condensing a gas so as to condense the gas into waste liquid for recollection. In an embodiment of the present disclosure, the residual gas is further passed through a filter material. Thus, the residual gas in the enclosure 200 is recollected by the gas condensation recollection module, so that the enclosure 200 can be disengaged as quickly as possible after the maintenance operation is complete and leakage and diffusion of the residual gas can be prevented.

In an embodiment of the present disclosure, the enclosure 200 further includes an airtight switch which is adapted to selectively be arranged in alignment with the airtight equipment 500, such that the enclosure 200 is connected in an airtight manner to the airtight equipment 500. In an embodiment of the present disclosure, the airtight switch includes a slider disposed at one of the enclosure 200 and the airtight equipment 500. The airtight switch includes a contact element disposed at the other of the enclosure 200 and the airtight equipment 500. The contact element has a sloped surface, and the slider selectively abuts against the sloped surface. The airtight switch includes a linear drive device adapted to drive the slider to move linearly in a sliding direction, wherein the sliding direction is parallel to a junction plane when the enclosure 200 and the airtight equipment 500 are joined with each other. Thus, the airtight switch is adapted to be applied to a junction between the enclosure 200 and the airtight equipment 500 requiring good sealing and airtightness.

In an embodiment of the present disclosure, the apparatus for automated maintenance is capable of repairing and maintaining other types of machines, as well as replacing electronic components and/or mechanism components of different types of machines. In an embodiment of the present disclosure, the apparatus for automated maintenance is capable of repairing and maintaining other machines that need to be kept in an airtight condition, to prevent leakage of internal gases and to maintain the overall airtightness during the repair and maintenance processes.

Refer to FIG. 3A to FIG. 3E showing schematic diagrams of a process of operations of an apparatus for automated maintenance according to an embodiment of the present disclosure.

Figure 3A:
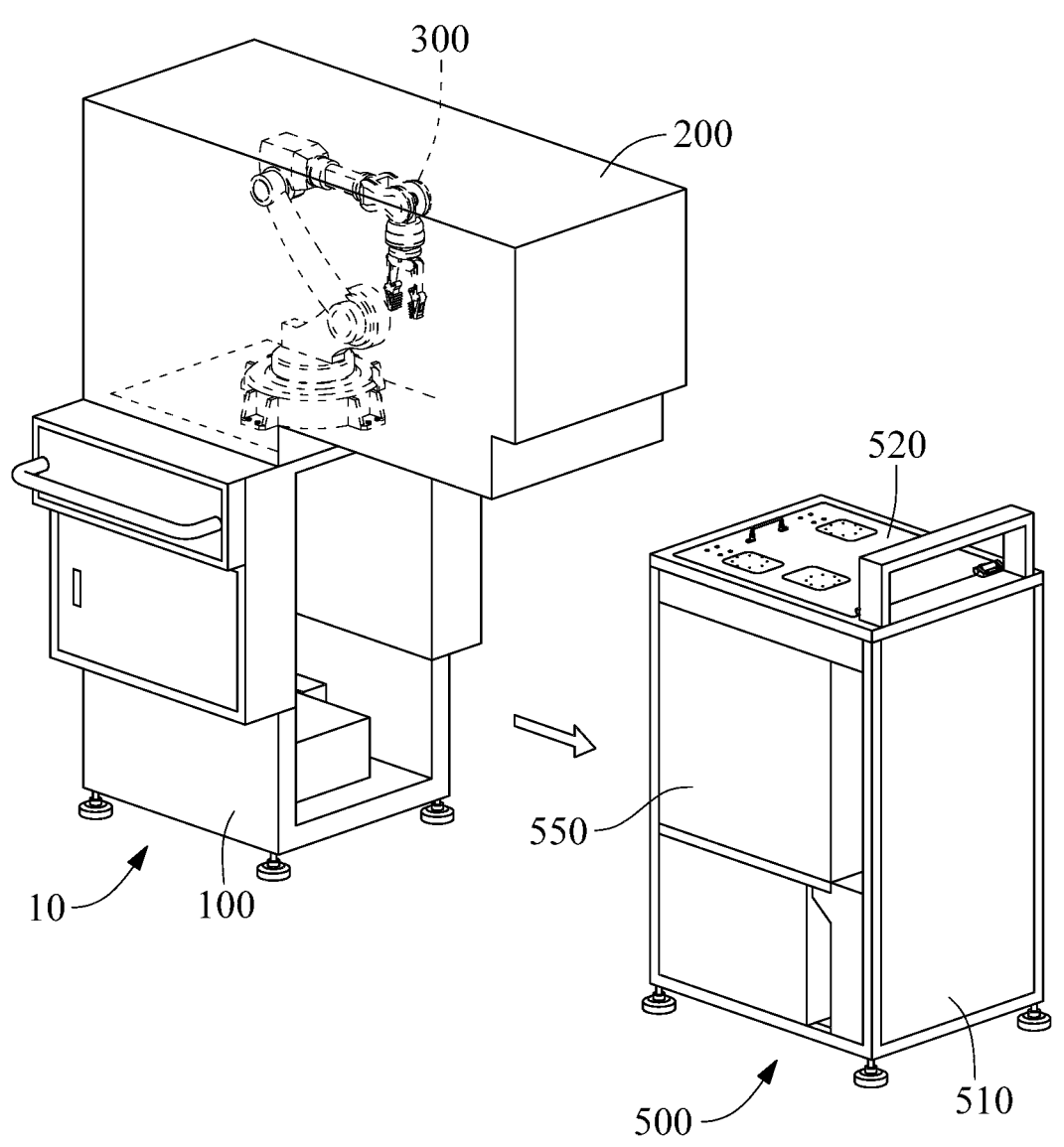
FIG. 3A is a schematic diagram of an operation of an
apparatus for automated maintenance according to an
embodiment of the present disclosure.

As shown in FIG. 3A, in an embodiment of the present disclosure, when the equipment component 550 in the airtight equipment 500 encounters a problem or needs replacement, the airtight equipment 500 sends a signal of maintenance requirement information to the wireless communication module of the automated maintenance machine 100. The airtight equipment 500 communicates with the automated maintenance machine 100 to notify the automated maintenance machine 100 to maintain or replace the equipment component 550 of the airtight equipment 500 according to contents of the maintenance requirement information. Upon receiving the signal of the maintenance requirement information sent by the airtight equipment 500, the automated maintenance machine 100 sends related information to the motion module of the automated maintenance machine 100. Thus, the automated maintenance machine 100 moves to a designated position near the airtight equipment 500 by the motion module, and approaches the airtight equipment 500 with a direction of the enclosure opening facing the airtight equipment 500 (for example, as the direction indicated by the arrow in FIG. 3A), for the enclosure opening to be adapted to join with the cover structure 520 (that is, a switch, a cover structure at an opening or a door panel) of the airtight equipment 500.

Figure 3B:
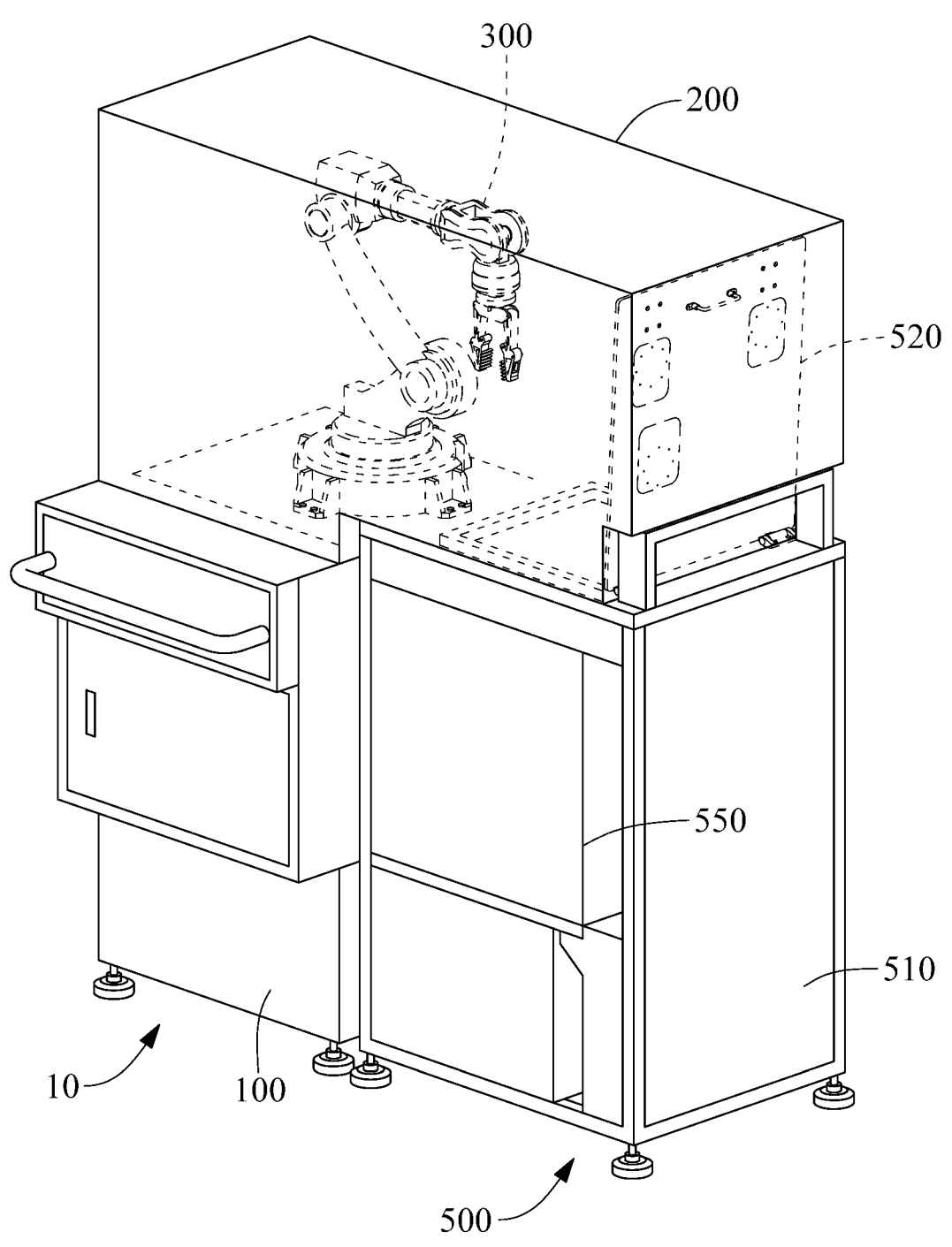
FIG. 3B is a schematic diagram of an operation of an
apparatus for automated maintenance according to an
embodiment of the present disclosure.

As shown in FIG. 3B, in an embodiment of the present disclosure, once the automated maintenance machine 100 has moved to a designated machine position (for example, a position next to the airtight equipment 500), the enclosure 200 over the automated maintenance machine 100 is connected and joined with the airtight equipment 500. Once it is ensured that a junction between the enclosure 200 and the airtight equipment 500 is airtight, the cover structure 520 of the airtight equipment 500 is opened, such that the enclosure space formed by the enclosure 200 becomes in communication with the accommodation space formed by the casing 510 of the airtight equipment 500, while airtight relative to the outside is sustained so that the gas in the airtight equipment 500 does not leak or diffuse out of the enclosure 200.

Figure 3C:
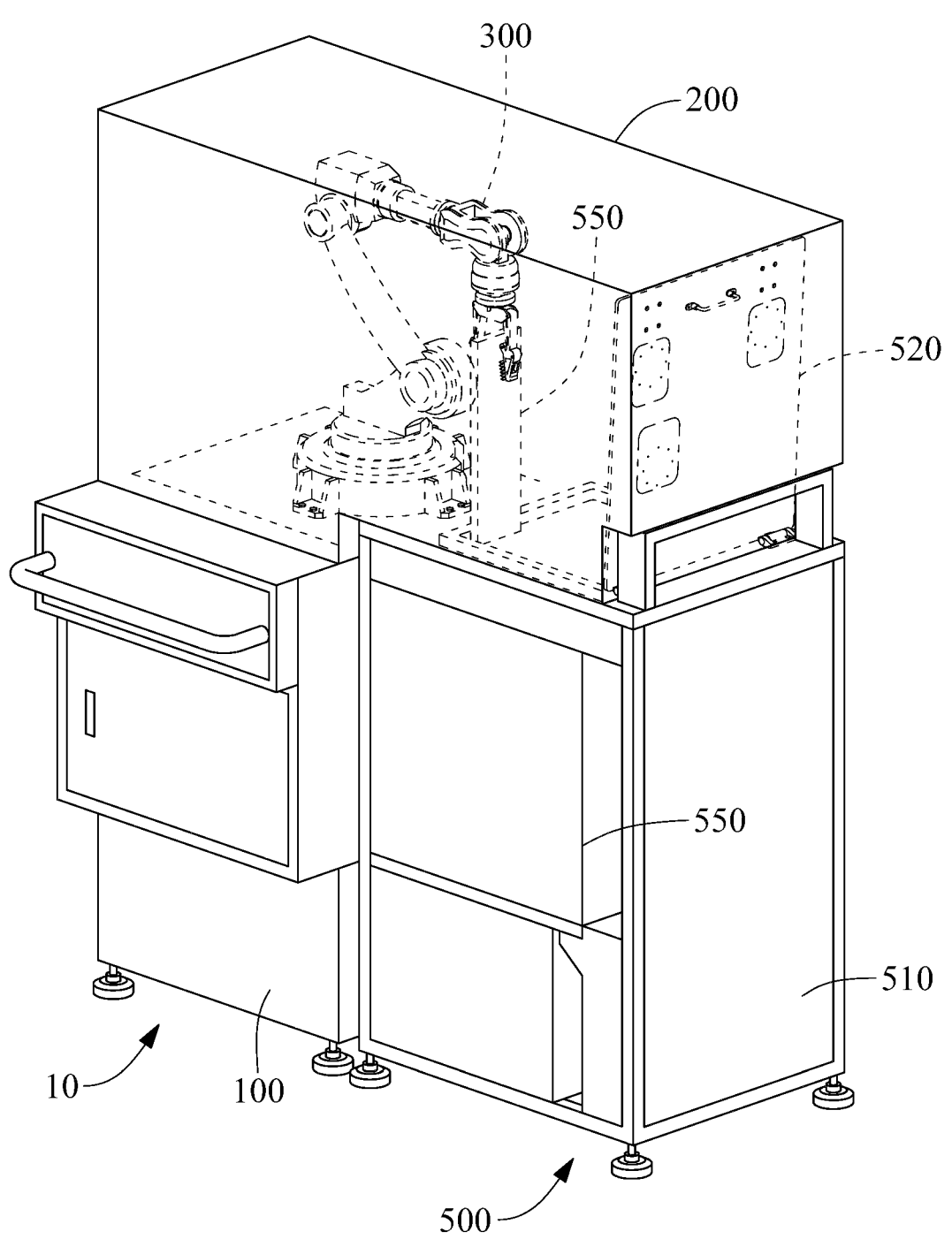
FIG. 3C is a schematic diagram of an operation of an
apparatus for automated maintenance according to an
embodiment of the present disclosure.

As shown in FIG. 3C, in an embodiment of the present disclosure, the robotic arm 300 starts replacing the problematic equipment component 550 to be replaced, and clamps and places the problematic equipment component 550 to an eliminate product area for the equipment component 550 in the automated maintenance machine 100. In an embodiment of the present disclosure, the robotic arm 300 performs replacement by using a new equipment component 550 in a spare part storage area for storing and transporting the equipment component 550 in the automated maintenance machine 100 to the airtight equipment 500. All of the operations above are performed in an airtight environment formed by the enclosure space of the enclosure 200 and the accommodation space of the airtight equipment 500.

Figure 3D:
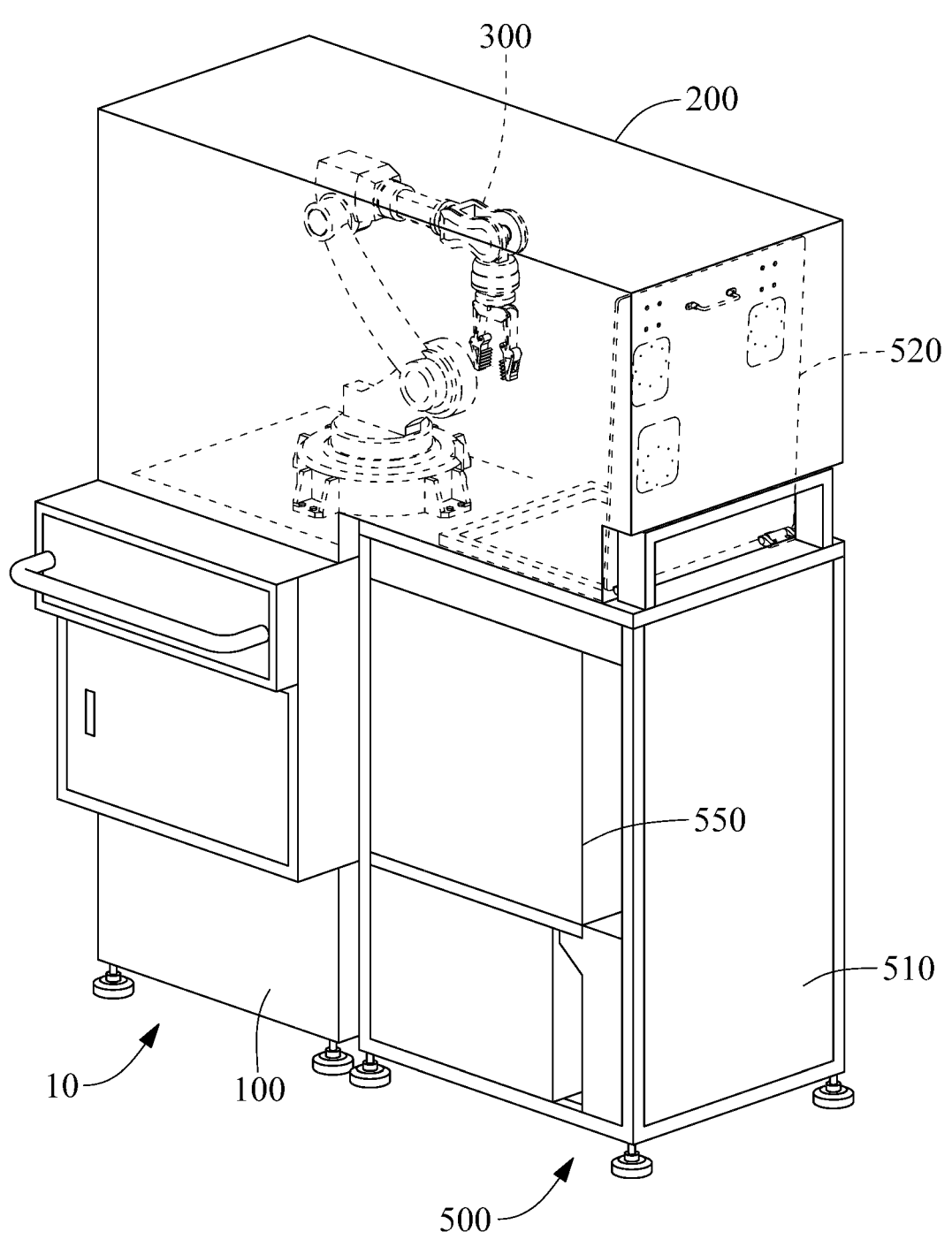
FIG. 3D is a schematic diagram of an operation of an
apparatus for automated maintenance according to an
embodiment of the present disclosure.

As shown in FIG. 3D, in an embodiment of the present disclosure, once the replacement of the equipment component 550 is complete, the robotic arm 300 also completes its task and moves to an original standby position, and the cover structure 520 is closed to release the communication between the accommodation space and the enclosure space.

Figure 3E:
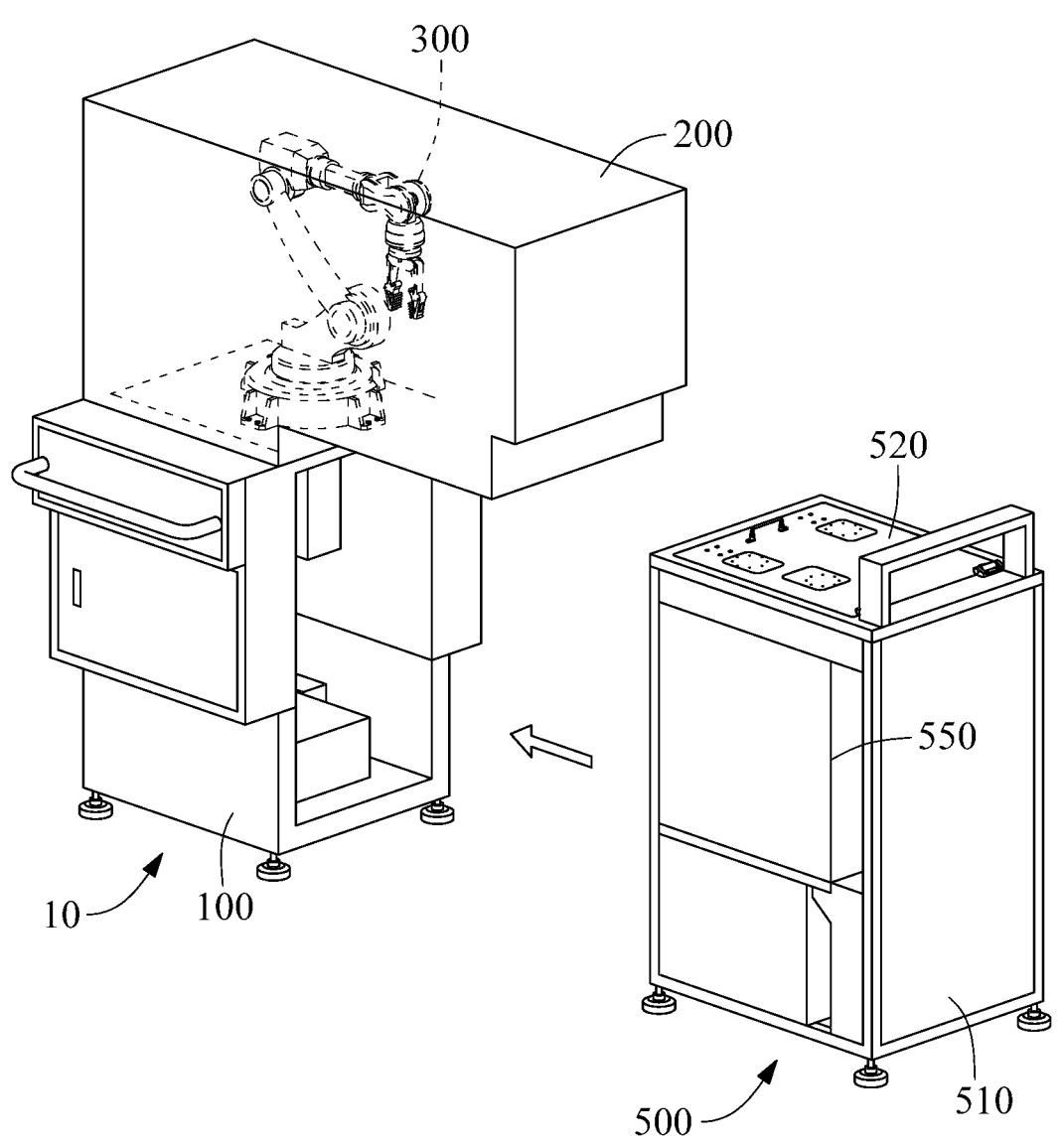
FIG. 3E is a schematic diagram of an operation of an
apparatus for automated maintenance according to an
embodiment of the present disclosure.

As shown in FIG. 3E, in an embodiment of the present disclosure, once the cover structure 520 is closed and the robotic arm 300 has returned to the original standby position, the apparatus 10 for automated maintenance determines that the concentration of the residual gas is within a predetermined range, the airtight joining between the enclosure 200 and the airtight equipment 500 is released, and the enclosure 200 is disengaged from the airtight equipment 500. In an embodiment of the present disclosure, the automated maintenance machine 100 moves to a standby position in the factory.

In an embodiment of the present disclosure, the apparatus 10 for automated maintenance is provided with a gas detector so as to detect the concentration of the residual gas in the enclosure space. The gas detector can be disposed in the enclosure 200 or can be disposed at the automated maintenance machine 100, and is adapted to detect the type of a gas and the concentration of a gas.

FIG. 4 shows a schematic diagram of operations of a method for automated maintenance according to an embodiment of the present disclosure. A method for automated maintenance adapted for an airtight equipment is provided according to an embodiment of the present disclosure. The airtight equipment includes, for example but not limited to, various types of machines or devices that need to be kept airtight and prevent gas leakage during operations, such as cooling devices, computing devices, and process cleansing devices. In an embodiment of the present disclosure, the method for automated maintenance is adapted for the apparatus for automated maintenance such as that shown in FIG. 1 to FIG. 3E. The method for automated maintenance can be completed specifically by operations S410 to S450 shown in FIG. 4. It should be noted that the numerals of the steps are merely illustrative and are not to be construed as limitations to an operation order.

In operation S410, an enclosure and a robotic arm are provided, wherein the robotic arm is disposed in the enclosure.

In operation S420, the enclosure is aligned with the airtight equipment. In an embodiment of the present disclosure, an opening of the enclosure is aligned with the airtight equipment.

In operation S430, at least one portion of the airtight equipment aligned with the enclosure is opened. In an embodiment of the present disclosure, after the enclosure is aligned with an opening, a switch or a window of the airtight equipment, the opening, the switch, a cover structure of the window, or a door panel of the airtight equipment is opened.

In operation S440, an enclosure space formed by the enclosure is caused to be in communication with an accommodation space formed by the airtight equipment, and airtightness is formed.

In operation S450, at least one portion of the robotic arm is caused to enter the accommodation space so as to maintain or replace an equipment component.

Figure 5:
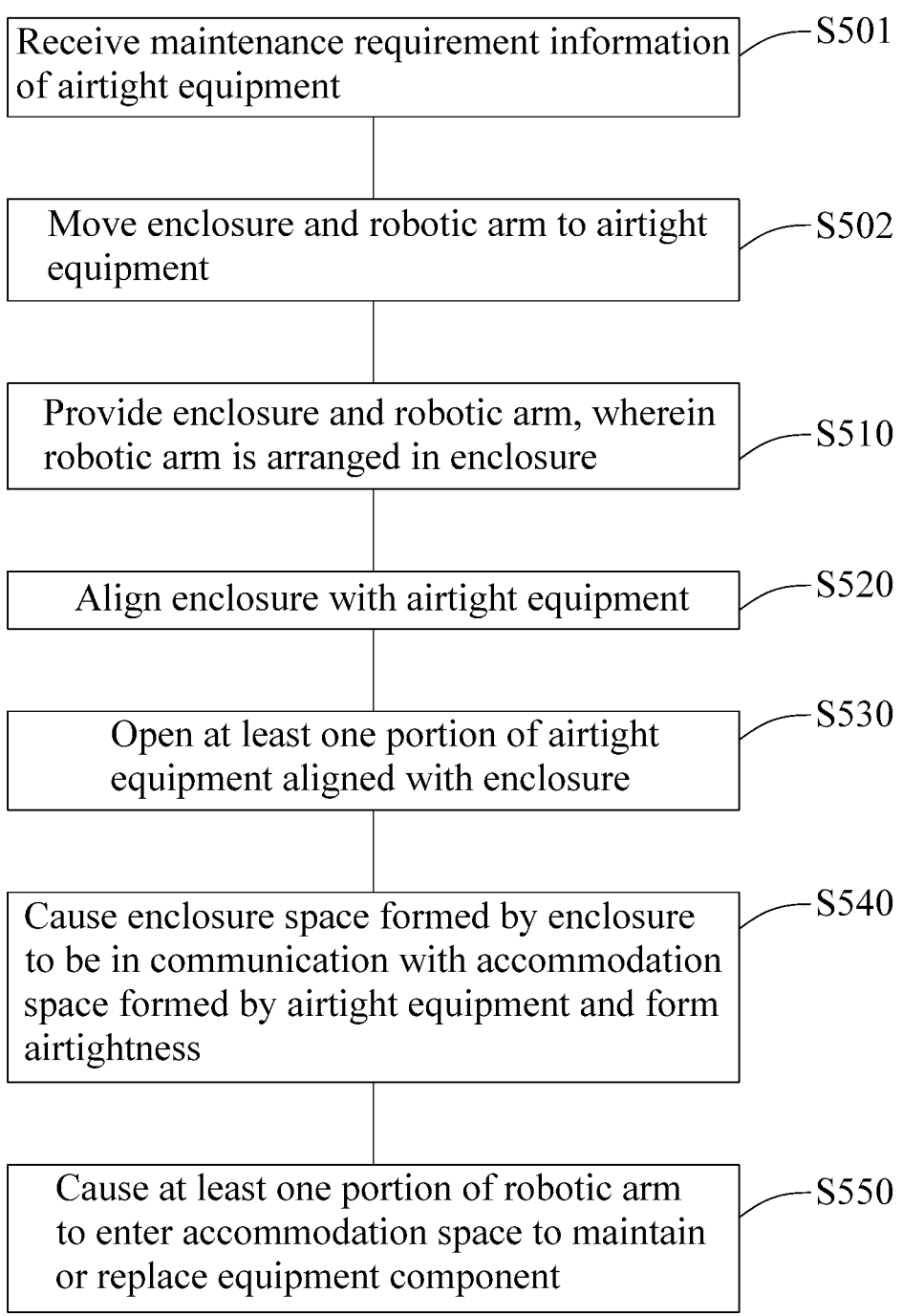
FIG. 5 is a schematic diagram of operations of a method
for automated maintenance according to an embodiment of
the present disclosure.

FIG. 5 shows a schematic diagram of operations of a method for automated maintenance according to an embodiment of the present disclosure. The present disclosure further provides a method for automated maintenance adapted for an airtight equipment. In an embodiment of the present disclosure, the method for automated maintenance is adapted for the apparatus for automated maintenance such as that shown in FIG. 1 to FIG. 3E. The method for automated maintenance can be completed specifically by operations S501 and S502 and operations S510 to S550 shown in FIG. 5. Details of operations S510 to S550 are fundamentally respectively the same as operations S410 to S450 in FIG. 4. It should be noted that the numerals of the steps are merely illustrative and are not to be construed as limitations to an operation order.

In operation S501, maintenance requirement information of an airtight equipment is received. In an embodiment of the present disclosure, the maintenance requirement information is, for example, a signal to be maintained from a machine to be maintained. In an embodiment of the present disclosure, the maintenance requirement information can include machine information, electronic apparatus damage information, and component replacement information, and a machine pairing mechanism can be further provided for pairing the apparatus for automated maintenance with the airtight equipment to be maintained and automatedly moving to the position of the airtight equipment to be maintained. In an embodiment of the present disclosure, the automated maintenance machine determines, according to a predetermined determination standard or a determination standard input from a user interface and the maintenance requirement information, whether the airtight equipment needs maintenance, or items of the airtight equipment that need maintenance or component replacement.

In operation S502, the enclosure and the robotic arm are moved to the airtight equipment.

Figure 6:
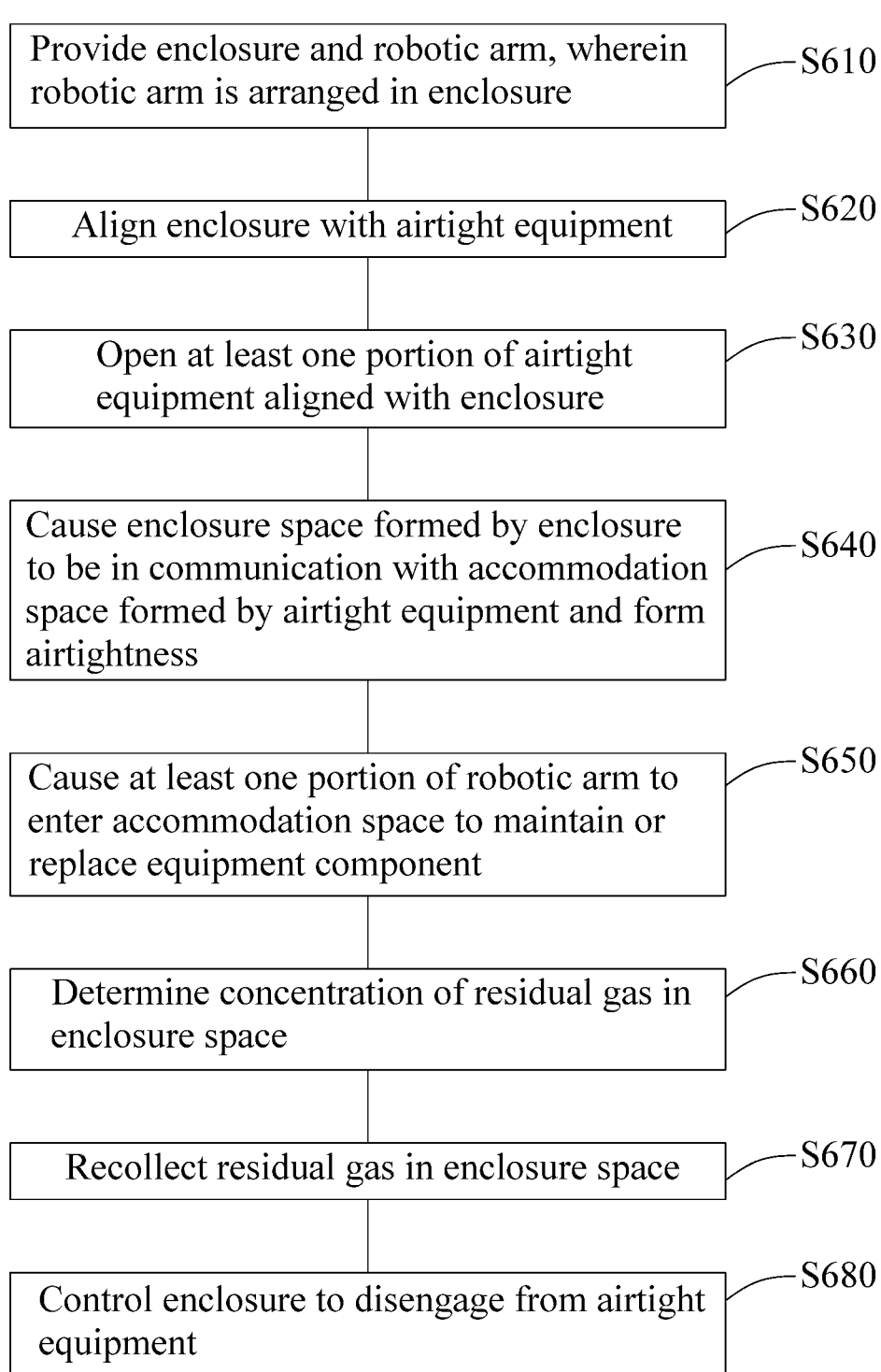
FIG. 6 is a schematic diagram of operations of a method
for automated maintenance according to an embodiment of
the present disclosure.

FIG. 6 shows a schematic diagram of operations of a method for automated maintenance according to an embodiment of the present disclosure. The present disclosure further provides a method for automated maintenance adapted for an airtight equipment. In an embodiment of the present disclosure, the method for automated maintenance is adapted for the apparatus for automated maintenance such as that shown in FIG. 1 to FIG. 3E. The method for automated maintenance can be completed specifically by operations S610 to S680 shown in FIG. 6. Details of operations S610 to S650 are fundamentally respectively the same as operations S410 to S450 in FIG. 4. It should be noted that the numerals of the steps are merely illustrative and are not to be construed as limitations to an operation order.

In operation S660, a concentration of a residual gas in the enclosure space is determined. Thus, after the operation of maintaining or replacing an equipment component is complete, the concentration of the residual gas in the enclosure space is first determined, so as to ensure that there are no hazards of gas leaking or diffusing when the enclosure is later disengaged. In an embodiment of the present disclosure, it is determined whether the concentration of the residual gas in the enclosure space meets a predetermined standard according to the predetermined standard.

In operation S670, the residual gas in the enclosure space is recollected. For example, with a condensation recollection module or a filter material provided, the gas from the airtight equipment and remaining in the hood space can be recollected, and the concentration of the residual gas in the enclosure space can be reduced. In an embodiment of the present disclosure, it is determined according to the determined concentration of the residual gas in the enclosure space whether to recollect the residual gas in the enclosure space. In an embodiment of the present disclosure, after the residual gas in the enclosure space is recollected, the operation of determining the concentration of the residual gas in the enclosure space is further performed to ensure a gas concentration state thereof.

In operation S680, the enclosure is controlled to disengage from the airtight equipment. Only after the concentration of the residual gas in the enclosure space is determined and the residual gas is recollected, the enclosure is then controlled to disengage from the airtight equipment so as to ensure safety.

With the apparatus and the method for automated maintenance of the present disclosure, during maintenance or element replacement of the airtight equipment, the airtightness of joining between the enclosure and the airtight equipment is capable of preventing an internal gas from leaking or diffusing when the airtight equipment is opened. Moreover, with the automated maintenance machine and the robotic arm provided, labor or human intervention can be completely eliminated. Thus, related personnel are prevented from risks of coming into contact with or exposure to the internal gas during maintenance of the airtight equipment. In addition, the fully automated mode can significantly reduce related labor and maintenance costs, and achieve fully automated element replacement and machine maintenance. Moreover, with the combination of the automated maintenance machine, the robotic arm and the enclosure of the apparatus for automated maintenance of the present disclosure, the apparatus for automated maintenance is able to effectively move around in large-area factories, and reliably ensures the elimination of risks of gas diffusion during an operation process.

The present invention is described by way of the preferred embodiments above. A person skilled in the art should understand that, these embodiments are merely for describing the present invention are not to be construed as limitations to the scope of the present invention. It should be noted that all equivalent changes, replacements and substitutions made to the embodiments are to be encompassed within the scope of the present invention. Therefore, the protection of the present invention should be accorded with the broadest interpretation of the appended claims. so as to encompass all modifications and similar arrangements and processes.

What is claimed is:

1. An apparatus for automated maintenance, adapted to maintain an airtight equipment, the airtight equipment comprising a casing which forms an accommodation space and is adapted to accommodate an equipment component in the accommodation space, the apparatus for automated maintenance comprising:

an automated maintenance machine that stores and transports the equipment component;

an enclosure, connected to the automated maintenance machine, the enclosure forming an enclosure space, the enclosure selectively connected to the airtight equipment via an enclosure opening, such that the enclosure space is in communication with the accommodation space and forms airtightness wherein:

the enclosure comprises a maintenance door, and the maintenance door and the enclosure opening are arranged on two different sides; and in response to a motion signal, the automated maintenance machine drives with the connected enclosure to a position near the airtight equipment; and a robotic arm, disposed in the enclosure space, the robotic arm adapted to enter the accommodation space to maintain or replace the equipment component, the robotic arm further adapted to enter the automated maintenance machine to take or place the equipment component.

2. The apparatus for automated maintenance according to claim 1, further comprising:

a motion module, arranged at the automated maintenance machine, the motion module receiving the motion signal to thereby drive the automated maintenance machine to move.

3. The apparatus for automated maintenance according to claim 2, wherein the automated maintenance machine further comprises:

a wireless communication module that communicates with the airtight equipment or an outside environment.

4. The apparatus for automated maintenance according to claim 3, wherein the wireless communication module communicates with the airtight equipment to determine maintenance requirement information associated with the equipment component of the airtight equipment, automatedly pairs the automated maintenance machine with the airtight equipment according to the maintenance requirement information, and sends the motion signal to prompt the automated maintenance machine to move to the airtight equipment.

5. The apparatus for automated maintenance according to claim 4, wherein the automated maintenance machine is adapted to perform operations of:

receiving the maintenance requirement information;

controlling the motion module to move to the airtight equipment;

controlling the enclosure to connect to the airtight equipment and form airtightness; and controlling the robotic arm to enter the accommodation space so as to maintain or replace the equipment component.

6. The apparatus for automated maintenance according to claim 5, wherein the automated maintenance machine is further adapted to perform operations of:

determining a concentration of a residual gas in the enclosure space; and controlling the enclosure to disengage from the airtight equipment.

7. The apparatus for automated maintenance according to claim 1, wherein the enclosure is arranged on an outer side of the automated maintenance machine, and the enclosure extends in a direction away from the automated maintenance machine.

8. The apparatus for automated maintenance according to claim 1, further comprising:

a gas condensation recollection module that recollects a residual gas in the enclosure space.

9. The apparatus for automated maintenance according to claim 1, wherein the enclosure further comprises:

an airtight switch, adapted to selectively be arranged in alignment with the airtight equipment, such that the enclosure is connected in an airtight manner to the airtight equipment.

10. A method of automated maintenance for an airtight equipment, the method comprising:

providing an automated maintenance machine, an enclosure connected to the automated maintenance machine and a robotic arm, wherein the robotic arm is arranged in the enclosure;

in response to a motion signal, driving, by the automated maintenance machine with the connected enclosure and the robotic arm, to a position near the airtight equipment;

aligning the enclosure with the airtight equipment;

opening at least one portion of the airtight equipment aligned with the enclosure;

causing an enclosure space formed by the enclosure to be in communication, through an enclosure opening, with an accommodation space formed by the airtight equipment, thereby forming airtightness;

providing a maintenance door in the enclosure wherein the maintenance door and the enclosure opening are on two different sides; and causing at least one portion of the robotic arm to enter the accommodation space so as to maintain or replace an equipment component.

11. The method for automated maintenance according to claim 10, further comprising:

receiving maintenance requirement information of the airtight equipment; and moving the enclosure and the robotic arm to the airtight equipment.

12. The method for automated maintenance according to claim 10, further comprising:

determining a concentration of a residual gas in the enclosure space; and controlling the enclosure to disengage from the airtight equipment.

13. The method for automated maintenance according to claim 12, further comprising:

recollecting the residual gas in the enclosure space.

* * * * *